Nov. 3, 1942.  H. A. WAGNER ET AL  2,300,752
COMBINATION CLUTCH, BRAKE, AND CONTROL MECHANISM
Filed July 15, 1941  2 Sheets-Sheet 1
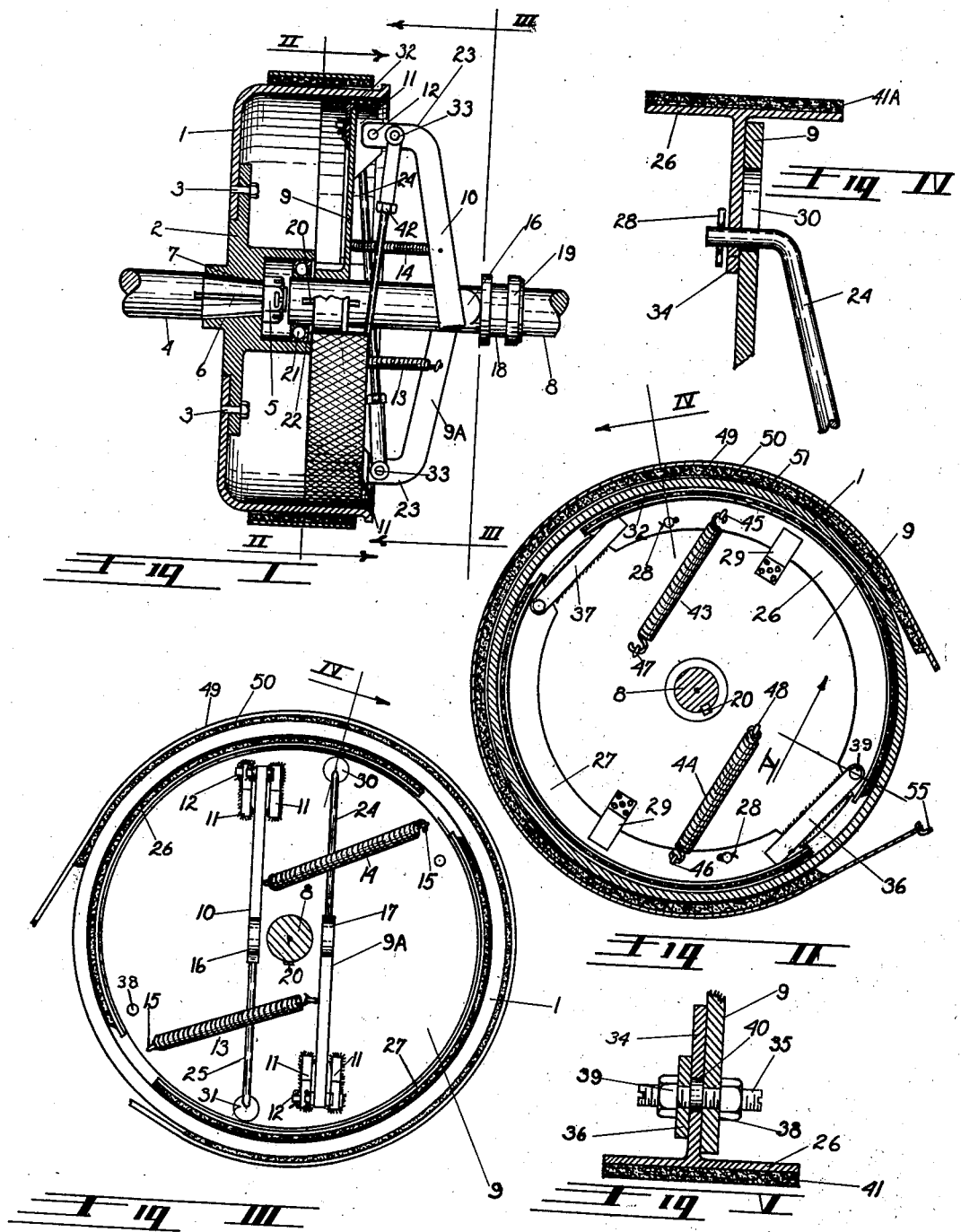
INVENTORS
HAROLD A. WAGNER
GUSTAVE H. WAGNER
BY E. G. Buckson
ATTORNEY

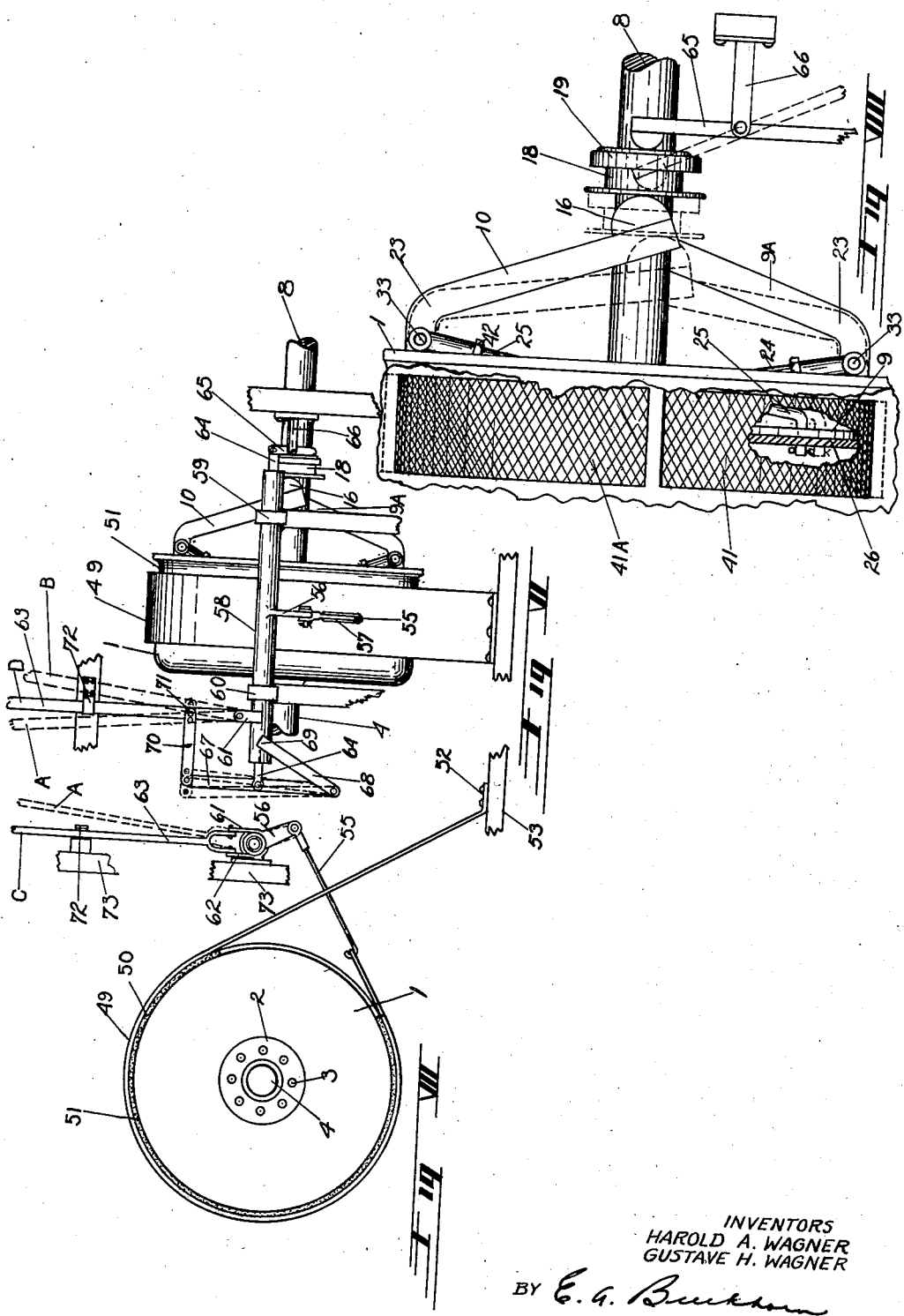

Patented Nov. 3, 1942

2,300,752

UNITED STATES PATENT OFFICE 2,300,752

COMBINATION CLUTCH, BRAKE, AND CONTROL MECHANISM

Harold A. Wagner and Gustave H. Wagner, Portland, Oreg.

Application July 15, 1941, Serial No. 402,462

13 Claims. (Cl. 192—17)

This invention relates to improvements in combination clutch and brake mechanisms, and control means therefor.

In driving arrangements such as for hoist winches and the like, it is desirable to provide a combination clutch and brake mechanism whereby the winch drum may be driven in one direction by a prime mover through engagement of the clutch or controlled in either direction of rotation by application of the brake. To simplify the control of such mechanism both the clutch and the brake means may be connected to a single manually operable lever. The lever arrangement including the connections to the brake and clutch mechanisms should be such that complete control may be had at all times of the driven shaft.

It is an object of the present invention to provide a new and improved combined clutch and brake mechanism comprising a relatively few parts of simple design and of low manufacturing cost.

A further object of the invention is to provide a new and improved clutch mechanism which is relatively rugged so as to be capable of transmitting heavy loads, easy to adjust and maintain.

A further object of the invention is to provide a new and improved manual control arrangement for a combined clutch and brake mechanism.

In accordance with the illustrated embodiment, the invention comprises a driven shaft having a drum fixedly mounted upon the end thereof and within which is arranged a clutch mechanism mounted upon the end of a drive shaft. The clutch mechanism is of a new and improved expanding shoe type of a simplified design, operable by means of a sliding collar provided on the drive shaft and which is connected for operation to a control lever. Surrounding the drum is a brake band which is also connected to the manual control lever. The improved control arrangement includes connections between the manual control lever and the brake band and also between the sliding collar of the clutch mechanism whereby movement of the control lever in one plane controls the clutch and movement of the lever in a second plane at right angles to the first controls the brake, while movement of the control lever in diagonal directions between the two planes effects simultaneous proportional control of both clutch and brake.

Further objects and advantages of the invention will appear from the following description taken in connection with the accompanying drawings, while the features of novelty will be pointed out with greater particularity in the appended claims.

In the drawings, Figure 1 is a longitudinal cross sectional view illustrating the combined clutch and brake mechanism constructed in accordance with one form of the invention; Figure 2 is a sectional view taken along the line 2—2 of Figure 1; Figure 3 is a sectional view taken along the line 3—3 of Figure 1; Figure 4 is a detail sectional view taken along the line 4—4 of Figure 2; Figure 5 is a detail sectional view taken along the line 5—5 of Figure 2; Figure 6 is a side elevation of the clutch and brake mechanism illustrating further the control means therefor; Figure 7 is an end view of the arrangement shown in Figure 6; and Figure 8 is a fragmentary view of the clutch control means illustrating the mechanism in various positions of adjustment.

Referring more particularly to Figure 1, a drum 1 attached to a hub 2 as by bolts 3 is mounted upon the end of a driven shaft 4 and secured thereon by nut 5. In order further to prevent relative rotation between the drum and the driven shaft 4 a suitable key 6· is provided between the hub and the tapered shaft end portion 7. A drive shaft 8 aligned with the driven shaft 4 has a clutch unit mounted upon the end thereof internally of the drum 1. The clutch unit comprises a carrier plate or disc 9 which is securely fastened to the shaft 8 as by means of key 20. Mounted upon the carrier plate 9 are a pair of oppositely extending control arms 9A and 10 which arms are pivoted at their outer ends to lugs 11 by means of pins 12. The lugs 11 are secured as by welding to the outer face of the carrier plate 9 and at diametrically opposed points near the edge of the plate. The arms 9A and 10 extend toward each other and toward the center of the plate in a generally parallel relation on opposite sides of the shaft 8. The arms 9A and 10 are biased toward each other and toward the carrier plate 9 by means of tension springs 13 and 14, the arrangement of which is shown more clearly in Figure 3. The springs 13 and 14 secured to suitable points on the arms 9A and 10, respectively, are anchored to the carrier plate as indicated at 15, and tend to keep the arms 9A and 10 in close to the shaft 8, while the drive shaft is being rotated by a prime mover connected thereto. Bearing tips 16 and 17 are provided on the ends of the control arms 10 and 9A, respectively, adjacent the shaft 8 and which are adapted to be cooperatively engaged by a sliding collar 18 mounted upon the shaft 8 and which is in turn controlled by means to be described hereinafter for effecting operation of the clutch.

The hub of the carrier plate 9 is mounted on the drive shaft 8 a slight distance from the end thereof so that the end portion of the drive shaft 8 extends into a cylindrical extension 22 of the drum hub 2. A suitable bearing 21 is provided between the end of the shaft 8 and the cylindrical extension 22 so as to permit of free relative rotation therebetween, while at the same time maintaining the shafts 4 and 8 in alignment with each other.

The clutch shoes 26 and 27 are arranged around the supporting disc 9 and are each pivotally attached at one end to diametrically opposite points of the disc by means including bolts 35 extending through the shoe flange portions 34. A pair of bars 36 and 37 which are welded intermediate their ends to the supporting disc 9 have their opposite ends spaced from the disc 9 for cooperatively receiving therebetween the adjacent end portions of the shoe flanges 34. The bolts 35, as shown more clearly in Figure 5, extend through one end of the bars 36, 37 and through the supporting disc 9, and are provided with a cam 40 providing a pivotal bearing surface on the end of the corresponding shoe mounted thereupon. Upon the opposite ends of the bolt 35 are nuts 38 and 39 to secure the bolt 35 against movement. By loosening the nuts 38 and 39 the bolt 35, and hence the cam 40, may be slightly rotated to effect outward adjustment of the ends of the clutch shoes as may be required as the clutch lining 41 and 41A becomes worn.

The outer end portions 23 of the control arms 9A and 10, which are pivotally mounted upon the supporting lugs 11, extend at an angle with respect to the main portions of the arms so that the arms are in the form of cranks. Pivotally secured to the end portions 23 of the control arms at 33 are a pair of expansion rods 24 and 25 which extend in alignment with the respective arms 9A and 10 to the opposite sides of the disc 9, the extreme ends of the expansion rods being connected to the clutch shoes 26 and 27. As illustrated more clearly in the view of Figure 4, the disc 9 is provided with a pair of relatively large openings 30 and 31 adjacent the periphery thereof through which the angularly bent ends of the expansion rods extend for connection to the flanges 34 of the clutch shoes. The flanges 34 of the clutch shoes are provided with openings for cooperatively receiving the ends of the rods 24 and 25, the rod ends being secured thereto such as by means of cotter pins 28. The holes 30 and 31 being of relatively large diameter permit outward movement of the rods 24 and 25 for effecting outward or expansion movements of the clutch shoes into engagement with the inner surfaces 32 of the drum 1. The flanges 34 of the clutch shoes are held against the side of the disc edge portion by suitable guides 29, while the flanges at the free ends of the shoes are guided between the ends of bars 36, 37 and disc 9. The ends of the bars 36 and 37 also act as stops for the ends of the shoes 26 and 27.

Adjusting nuts 42 are provided upon the rods 24 and 25 whereby the effective length of the respective rods can be varied. Thus the range of the outward movement of the clutch shoes can be adjusted to correspond with the range of movement of the control arms 9A and 10 upon operation of the collar 18.

The clutch shoes 26 and 27 are normally held in the disengaged position relative to the brake drum by means of a pair of springs 43 and 44, shown more clearly in Figure 2, which springs are connected to the free ends of the corresponding shoes as indicated at 45 and 46 and anchored at their opposite ends as at 47 and 48 to the supporting disc 9. Springs 43 and 44 are sufficiently strong as compared to springs 13 and 14 so that arms 9A and 10 will normally be biased outwardly with respect to disc 9.

Referring more particularly to Figures 6 and 7, a brake band 49 having a suitable liner 50 is arranged around the outer periphery 51 of the drum 1 and is fastened at one end 52 to any stationary support 53. The opposite end of the brake band 49 is secured by link 55 to one end of a lever arm 56. The link 55 extends through the cooperating opening 57 in the opposite end of the brake band as shown more clearly in Figure 6, so that a centered pull may be exerted through the lever arm 56. The arm 56 is rigidly secured at right angles to the operating shaft 58 which is journaled adjacent opposite ends in suitable bearings 59 and 60. For rotating the shaft 58 and thereby effecting adjustment of the brake band a manually operable lever 63 is secured at one end thereto, the lever being pivoted between a pair of lugs 61 and 62 rigidly secured to and extending at right angles from the opposite sides of the shaft 58. The shaft 58 is hollow and through which extends a rod 64 attached at one end to a clutch operating link 65. The link 65 is pivoted intermediate its ends upon a suitable stationary bracket 66 and has its opposite end extending inwardly adjacent the drive shaft 8 for cooperative engagement of the bearing surface 19 of the sliding collar 18. The opposite end of the rod 64 is pivotally connected to a central point of link 67, the lower end of which is pivotally connected to the end of a bracket arm 68 which is rigidly affixed as at 69 to the adjacent end of the shaft 58. The upper end of the link 67 is connected by cross link 70 to the manual control lever 68 as at 71. A catch 72 secured to a stationary support 78 is provided for holding the handle 63 in a predetermined position which will normally correspond to the engaged, or set, condition for the brake band 49.

The operation of the combined clutch and brake mechanism through manipulation of the control means therefor as described is substantially as follows. It will be understood that the drive shaft 8 is normally rotated by a prime mover connected thereto and hence the clutch mechanism will rotate with the drive shaft. To release the brake and effect driving engagement of the clutch, the handle 63 is first moved clear of the latch 72 by movement thereof in the direction of the longitudinal axis of the shaft 58. It will be observed that such movement of the handle 63 will not effect a rotation of the shaft 58 nor, consequently, a release of the brake band. To release the brake the handle is then moved radially with respect to the axis of the shaft 58 to the position A, shown in dotted lines in Figure 7, which will cause rotation of the shaft 58 in the clockwise direction and, hence, a release of the brake band. For effecting engagement of the clutch, the handle 63 is moved in the direction longitudinally of the shaft 8 to the right to some such position as indicated by dotted lines B in Figure 6, which will cause movement of the rod 64 through the shaft 58 to the right. Such movement of rod 64 will cause the lever 65 to pivot upon bracket 66 to the position indicated in dotted lines in Figure 8, shifting the sliding collar 18 into engagement with the ends 16, 17 of the clutch control arms 9A and 10. Inward movement of the clutch control arms 9A and 10 toward the disc 9 will effect outward, or expansion movement of the clutch shoes 26 and 27 into engagement with the inner surface of the drum 1 against the bias of the springs 43, 44.

To effect disengagement of the clutch mechanism the lever 63 is merely pivoted in the reverse direction longitudinally of the shaft 58, whereupon the drum 1 is released for free movement independent of either the clutch or brake as when lowering loads. For effecting engagement of the brake, the lever 63 is pushed back toward the stationary support 73, causing rotation of the shaft 58, in which position it may be locked by snapping it behind the catch 72. It will be observed that the transition from the driving to the braking conditions of adjustment, and vice versa, may be effected by means of control arrangement described without at any time releasing the control of the drum. Instead of moving the lever first in a straight line axially of the shaft 58 and then at right angles to rotate the shaft 58, the lever 63 may be shifted angularly, or diagonally, between the two positions, B and C, so that the brake is gradually applied simultaneously with the gradual release of the clutch engagement. The same transition of control may be effected from braking to driving.

It will be seen that the combined clutch and brake device as described comprises relatively few parts and which, furthermore, are of a relatively simple design requiring a minimum of machining operations for the manufacture thereof. It will be obvious that the new and improved clutch mechanism may be used in combination with the brake as described, or independently thereof as a separate unit.

Having described the principle of the invention in what is considered to be a preferred embodiment thereof, it is desired that it be understood that the specific details shown are merely illustrative, and that the invention may be carried out by other means.

What we claim is:

1. In a device of the class described, the combination comprising a drum having a clutch mechanism including a plate mounted internally of said drum, a pair of clutch shoes adjustably pivoted at one end to said plate, a pair of inwardly extending clutch control arms pivotally mounted on said plate, a pair of expansion rods being attached to said clutch shoes, a shaft supporting said plate extending outwardly between said control arms, spring means between said clutch shoes and said plate biasing said clutch shoes to a disengaged position, means on said shaft for engaging said control arms and expanding said clutch shoes against the inner surface of said drum, power take-off means attached to said drum, brake means mounted on said drum, and a single control means operatively connected to said brake means and said clutch mechanism.

2. In a device of the class described, the combination comprising a drum, a drive shaft extending coaxially of said drum, a plate secured to said shaft and positioned internally of said drum, a pair of arms hingedly fastened to said plate, a pair of clutch shoes extending around said plate, adjustable cam means fastening said shoes at one end to said plate, expansion rods connecting the opposite ends of said shoes to said arms, guide means fastened on said plate, spring means secured to said plate biasing said shoes into a disengaged position against said guide means, a slide collar mounted on said shaft, a brake band mounted about said drum, and means operatively connected to said slide collar and said brake band for effecting either separate or simultaneous actuation of said brake band and said clutch shoes.

3. In a device of the class described, the combination comprising a drum having an expanding type clutch mounted internally thereof, clutch actuating means, a brake band mounted around the outer surface of said drum, a control handle hingedly secured to a rotatably journaled hollow shaft, said handle being hingedly movable in the longitudinal direction of said shaft, an arm secured to said shaft and extending outwardly therefrom, a connection between said brake band and said arm, a rod extending through said shaft, said rod being operatively connected at one end to said clutch actuating means, and means connecting the opposite end of said rod to said control handle.

4. In a device of the class described, the combination comprising a drum having a hub, a drive shaft, the end of said shaft being journaled in said drum hub, a clutch plate mounted on said shaft, a pair of expansion shoes mounted on said plate, said clutch plate and shoes arranged within said drum, a brake band positioned around said drum and securely fastened at one end, a rotatably mounted hollow shaft, a lever fixedly secured to said shaft, a connecting link between said lever and the free end of said brake band, a sliding collar on said drive shaft for effecting engagement and disengagement of said shoes with said drum, a rod extending through said hollow shaft, a manually operable lever, hinge means securing said manually operable lever to said hollow shaft for movement in the longitudinal direction of said shaft, a rod extending through said hollow shaft and operatively connected at one end to said sliding collar and at the other end to said manually operable lever.

5. In a device of the class described, the combination comprising a drive shaft, a driven shaft, a drum fastened to said driven shaft, a brake band arranged around said drum, a clutch mechanism fastened to said drive shaft and mounted within said drum, a rotatably mounted hollow shaft, means connecting said hollow shaft to said brake band for effecting setting of said brake upon rotation of said hollow shaft, a rod extending through said hollow shaft and movable axially therethrough, said rod being operatively connected at one end to said clutch mechanism, a handle connected to said hollow shaft for effecting rotation thereof and to said rod for effecting longitudinal movement thereof.

6. In a driving arrangement for mounting between a drive shaft and a driven shaft, a brake element, a clutch element, means for manually controlling said elements comprising an outer shaft, a lever arm affixed to said outer shaft and connected to one of said elements, a manual operating lever connected to said outer shaft for rotating said outer shaft and effecting adjustment of said one element, said operating lever being hingedly connected to said outer shaft for pivotal movement in the plane of the axis of said outer shaft, an inner shaft extending through said outer shaft and connected at one end to the second of said elements, and linkage means connecting the opposite end of said inner shaft to said manual operating lever whereby pivotal movement of said operating lever on said outer shaft effects movement of said inner shaft axially of said outer shaft for adjusting said second element.

7. In a device of the class described, the combination comprising a drum, a shaft having one end extending into said drum coaxially thereof, a disc secured to the end of said shaft within said drum, a pair of clutch shoes arranged around the periphery of said disc for cooperatively engaging the inner surface of said drum, means pivotally attaching one end of each of said shoes to said disc at diametrically opposite points, a pair of crank arms pivotally mounted on said disc at opposite points adjacent the edge of said disc, said arms extending toward the center of said disc on opposite sides of said shaft, rods connecting said arms directly to the free ends of corresponding ones of said shoes, spring means normally biasing said shoes to the disengaged position, a sliding collar mounted on said shaft, control means for moving said collar along said shaft into engagement with the ends of said crank arms for moving said crank arm ends toward said disc to cause outward movement of said clutch shoes into frictional engagement with said drum.

8. In a device of the class described, the combination comprising a drum, a shaft extending coaxially of said drum, a supporting disc secured to said shaft and arranged within said drum, a pair of clutch shoes arranged around the periphery of said disc, means pivotally connecting one end of each of said shoes at diametrically opposed points to said disc, a pair of arms pivotally mounted on said disc at diametrically opposed points, said arms extending toward the center of said disc adjacent said shaft, rods pivotally secured to said arms adjacent the pivoted end thereof, said rods extending across said disc and connected at the other end directly to the free ends of corresponding clutch shoes, spring means biasing said clutch shoes to the disengaged position, and means mounted on said shaft movable into engagement with the ends of said arms for causing outward movement of said shoes into frictional engagement with the inner surface of said drum.

9. In a device of the class described, the combination comprising a drum, a shaft extending coaxially of said drum, a supporting disc secured to said shaft and arranged within said drum, a pair of clutch shoes arranged around the periphery of said disc, means pivotally connecting one end of each of said shoes to diametrically opposed points of said disc, a pair of crank arms pivotally mounted on said disc at diametrically opposed points thereof, said arms extending inwardly toward the center of said disc on opposite sides of said shaft, rods pivotally secured to said crank arms adjacent the pivoted end thereof, said rods extending across said disc to the opposite sides thereof and connected at the other end to the free ends of said clutch shoes, means normally biasing said clutch shoes to the disengaged position whereby the ends of said crank arms are normally held in a position away from said disc, and means for engaging with the ends of said arms for moving said crank arms toward said disc and effecting outward movement of said clutch shoes into engagement with the inner surface of said drum against the force of said biasing means.

10. In a device of the class described, the combination comprising a drum, a shaft extending coaxially of said drum, a supporting plate secured to said shaft and arranged within said drum, a pair of friction shoes, cam means pivotally connecting one end of each of said shoes to diametrically opposed points of said plate, a pair of crank arms pivotally mounted on said plate on opposite sides of said shaft, said arms extending inwardly to points adjacent said shaft, rods pivotally connected to said arms adjacent the pivotal support thereof, said rods extending transversely of said plate and connected at the opposite end directly to the free ends of said shoes, means slidably mounted on said shaft for engaging with said arms and moving said arms toward said disc to effect expansion movements of said shoes into engagement with the inner surface of said drum, said rods including means for adjusting the length thereof.

11. A driving mechanism comprising a drum, a shaft extending coaxially of said drum, a supporting plate secured to said shaft and arranged within said drum, a pair of clutch shoes, means pivotally connecting one end of each of said shoes to diametrically opposed points on said plate, a pair of crank arms pivotally mounted on said plate at diametrically opposed points adjacent the outer edge thereof, said arms extending inwardly to points adjacent opposite sides of said shaft, spring means between the ends of said arms and said plate for urging said arms toward said shaft, rods pivotally connected to said crank arms adjacent the pivotal mounting thereof, said rods extending transversely of said plate on opposite sides of said shaft, said rods being connected at the opposite ends directly to said clutch shoes whereby movement of said ends of said arms toward said disc effects outward movement of said clutch shoes into engagement with the inner surface of said drum, means biasing said clutch shoes to the disengaged position, and means slidably mounted on said shaft for moving the ends of said arms toward said plate.

12. A combined clutch and brake mechanism comprising a drive shaft, a driven shaft, a drum affixed to said driven shaft, a supporting plate mounted on said drive shaft and arranged within said drum, a pair of clutch shoes arranged around said plate, said shoes having inner radial flanges, means pivotally connecting said flanges at one end of said shoes to opposite points of said plate, means for holding said flanges at the free ends of said shoes against the side of said plate, a pair of crank arms pivotally mounted on said plate, the free ends of said arms extending inwardly to points adjacent to said drive shaft, adjustable rods pivotally connected to said crank arms adjacent to the pivotal mounting thereof, said rods extending in the direction of said arms to the opposite sides of said plate and connected to the free ends of corresponding ones of said clutch shoes, means biasing the ends of said arms toward said shaft, spring means connected to said shoes biasing said shoes to the disengaged position and simultaneously biasing said arms away from said plate, a clutch operating slide collar mounted on said drive shaft, a brake band surrounding said drum and control means for selectively actuating said brake band or said slide collar.

13. A driving arrangement comprising a drum, a shaft extending coaxially of said drum, a supporting disc secured to said shaft and arranged within said drum, a pair of clutch shoes having inner radially extending flanges, cam means pivotally connecting one end of the flange of each said shoe to diametrically opposed points of said disc, means for holding said shoe flanges against the side of the edge portion of said disc, a pair of crank arms pivotally mounted on said plate on opposite sides of said shaft, said arms extending inwardly to points adjacent said shaft, means connecting said crank arms to the free ends of said clutch shoes, spring means connected between said disc and said clutch shoes biasing said arms away from said disc, means slidably arranged on said shaft movable into engagement with said arms for moving said arms toward said disc and moving said clutch shoes outwardly into engagement with said drum.

HAROLD A. WAGNER.
GUSTAVE H. WAGNER.